US012794732B2

(12) United States Patent
Yasuda et al.

(10) Patent No.: US 12,794,732 B2
(45) Date of Patent: Nov. 10, 2026

(54) ON-BOARD COMMUNICATION APPARATUS, ON-BOARD COMMUNICATION SYSTEM, COMMUNICATION PROCESSING APPARATUS, AND COMMUNICATION METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Masahiro Yasuda, Yokkaichi (JP); Shigeto Akahori, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 232 days.

(21) Appl. No.: 18/842,618

(22) PCT Filed: Feb. 27, 2023

(86) PCT No.: PCT/JP2023/006956
§ 371 (c)(1),
(2) Date: Aug. 29, 2024

(87) PCT Pub. No.: WO2023/167124
PCT Pub. Date: Sep. 7, 2023

(65) Prior Publication Data
US 2025/0175366 A1 May 29, 2025

(30) Foreign Application Priority Data
Mar. 3, 2022 (JP) ................................ 2022-032892

(51) Int. Cl.
*H04L 12/46* (2006.01)

(52) U.S. Cl.
CPC .................................... *H04L 12/46* (2013.01)

(58) Field of Classification Search
CPC ......... H04L 12/46; H04L 12/66; H04L 69/08; H04L 69/18
See application file for complete search history.

(56) References Cited

U.S. PATENT DOCUMENTS

2010/0070106 A1 3/2010 Okamoto et al.
2010/0215043 A1 8/2010 Hisada
(Continued)

FOREIGN PATENT DOCUMENTS

WO WO-2018172926 A1 * 9/2018 .......... H04W 12/088

OTHER PUBLICATIONS

Seo et al., "Design of an Automotive Gateway for In-Vehicle Networks", Jul. 29, 2010, American Society of Mechanical Engineering (ASME), ASME/IEEE 2009 International Conference on Mechatronic and Embedded Systems and Applications, DETC2009-86108, pp. 165-174, https://doi.org/10.1115/DETC2009-86108 (Year: 2010).*

(Continued)

*Primary Examiner* — Paul H. Masur
(74) *Attorney, Agent, or Firm* — Brooks Kushman P.C.

(57) ABSTRACT

An on-board communication apparatus includes an application processing unit and a communication processing unit that includes: a first communication unit that performs communication with a first communication protocol; one or more second communication units that perform communication with a second communication protocol that is different from the first communication protocol; a generation unit that generates relay data including first data received by the first communication unit and second data received by the (Continued)

second communication units; and a relay unit that transmits the generated relay data to the application processing unit, wherein the generation unit: compiles multiple pieces of first data received by the first communication unit and adds first additional information thereto; adds second additional information to each piece of second data received by the second communication units; and generates the relay data, in which first data and second data each having additional information added are compiled.

16 Claims, 8 Drawing Sheets

(56) References Cited

U.S. PATENT DOCUMENTS

2018/0287815 A1* 10/2018 Yamamoto .......... H04L 12/4625
2019/0068407 A1* 2/2019 Haga ................. H04L 12/40006
2019/0141133 A1* 5/2019 Rajan ...................... H04L 45/52
2019/0207862 A1 7/2019 Kajio et al.
2021/0184886 A1* 6/2021 Maeda .................... H04L 69/16
2023/0198807 A1* 6/2023 van de Burgt ...... H04L 12/4135 370/363
2023/0198900 A1* 6/2023 Hutkins .................. H04L 12/66 370/395.6

OTHER PUBLICATIONS

Rishvanth et al., "Design of an in-vehicle network (Using LIN, CAN and FlexRay), gateway and its diagnostics using vector CANoe", Feb. 2012, American Journal of Signal Processing 1(2), pp. 40-45, DOI:10.5923/j.ajsp.20110102.07, (Year: 2012).*

Seo et al., "A Reliable Gateway for In-Vehicle Networks Based on LIN, CAN, and FlexRay", Apr. 5, 2012, ACM Transactions on Embedded Computing Systems (TECS), vol. 11, Issue 1, Article No. 7, pp. 1-24, https://doi.org/10.1145/2146417.2146424 (Year: 2012).*

International Search Report, Application No. PCT/JP2023/006956, mailed May 9, 2023. ISA/Japan Patent Office.

* cited by examiner

ON-BOARD COMMUNICATION APPARATUS, ON-BOARD COMMUNICATION SYSTEM, COMMUNICATION PROCESSING APPARATUS, AND COMMUNICATION METHOD

CROSS-REFERENCE TO RELATED APPLICATIONS

This application is the U.S. national stage of PCT/JP2023/006956 filed on Feb. 27, 2023, which claims priority of Japanese Patent Application No. JP 2022-032892 filed on Mar. 3, 2022, the contents of which are incorporated herein.

TECHNICAL FIELD

The present disclosure relates to an on-board communication apparatus and an on-board communication system that are installed in a vehicle and that communicate with another apparatus inside or outside the vehicle.

BACKGROUND

JP 2008-174098A proposes a vehicle control system that includes a control-system electronic control unit (ECU) that includes a processor equipped with a real-time operating system (OS), and an information-system ECU that includes a processor equipped with a real-time OS and a processor equipped with a multimedia OS. In this vehicle control system, communication between the control-system ECU and the information-system ECU is performed by the processors equipped with real-time OSs, and communication within the information-system ECU is performed by an inter-core communication function of the processor equipped with a real-time OS and an inter-core communication function of the processor equipped with a multimedia OS.

In an ECU having a plurality of cores mounted thereon, such as that in the vehicle control system disclosed in JP 2008-174098A, there are cases in which a first core that communicates with another ECU and a second core that executes an application program are provided, and roles are allocated such that the first core relays communication between the other ECU and the second core, for example. In the case of such a configuration, the first core packs (compiles) multiple pieces of data received from the other ECU (into one piece of data), and transmits the packed data to the second core. Furthermore, in a case in which the first core communicates with a plurality of ECUs with a plurality of communication protocols, the first core performs the packing in a state in which information such as that indicating the communication protocol with which communication was performed is added to received data, and transmits the packed data to the second core. Such relay processing by the first core may become a bottleneck and cause ECU processing delay, etc.

The present disclosure has been made in view of such circumstances, and one aim thereof is to provide an on-board communication apparatus, an on-board communication system, communication processing apparatus, and a communication method that are expected to reduce the load of processing for relaying the transmission and reception of data between a core and other apparatuses.

SUMMARY

An on-board communication apparatus according to the present aspect includes: an application processing unit that executes an application program; and a communication processing unit that includes: a first communication unit that communicates with one or more on-board apparatuses with a first communication protocol; one or more second communication units that communicate with one or more on-board apparatuses with a second communication protocol that is different from the first communication protocol; a generation unit that generates relay data including first data received by the first communication unit and second data received by the second communication units; and a relay unit that transmits the generated relay data to the application processing unit, wherein the generation unit: compiles multiple pieces of first data received by the first communication unit and adds first additional information thereto; adds second additional information to each piece of second data received by the second communication units; and generates the relay data, in which first data having the first additional information added thereto and one or more pieces of second data each having the second additional information added thereto are compiled.

Not only can the present application be realized as apparatuses including such characteristic processing units, but the present application can also be realized as a method including such characteristic processing as steps, or as a computer program for causing a computer to execute such steps. The present application can be realized as a semiconductor integrated circuit realizing such apparatuses in part or entirely, or as another apparatus or system including such apparatuses.

Advantageous Effects

According to the above, it is expected that the load of processing for relaying the transmission and reception of data between a core and other apparatuses will be reduced.

DETAILED DESCRIPTION OF PREFERRED EMBODIMENTS

Figure 1:
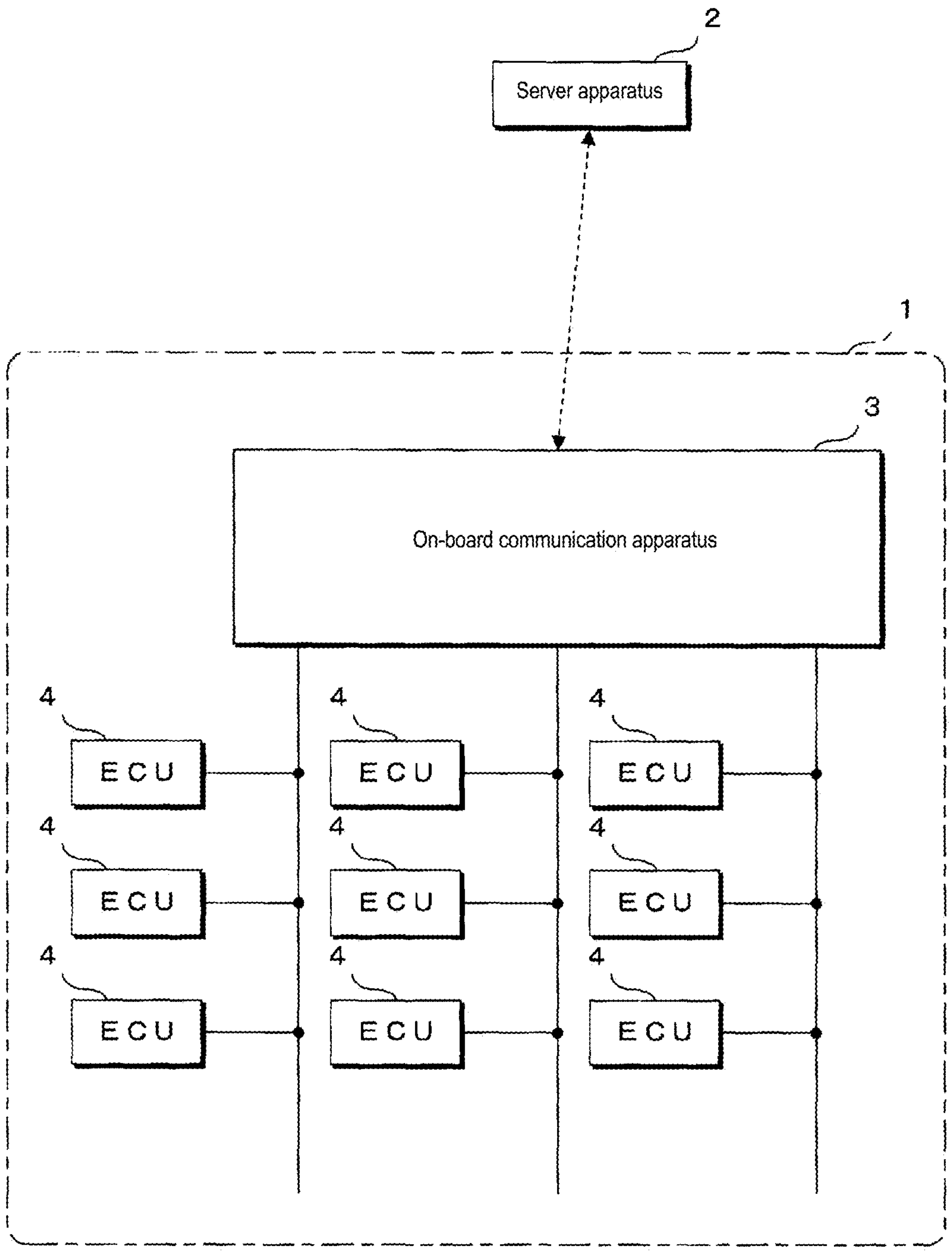
FIG. 1 is a schematic diagram illustrating a configuration of an on-board communication system according to the present embodiment.

First, aspects of embodiment of the present disclosure will be listed and described. At least some of the embodiments described in the following may be combined as appropriate.

An on-board communication apparatus according to the present aspect includes: an application processing unit that executes an application program; and a communication processing unit that includes: a first communication unit that communicates with one or more on-board apparatuses with a first communication protocol; one or more second communication units that communicate with one or more on-board apparatuses with a second communication protocol that is different from the first communication protocol; a generation unit that generates relay data including first data received by the first communication unit and second data received by the second communication units; and a relay unit that transmits the generated relay data to the application processing unit, wherein the generation unit: compiles multiple pieces of first data received by the first communication unit and adds first additional information thereto; adds second additional information to each piece of second data received by the second communication units; and generates the relay data, in which first data having the first additional information added thereto and one or more pieces of second data each having the second additional information added thereto are compiled.

In the present aspect, an on-board communication apparatus includes an application processing unit and a communication processing unit. The application processing unit is a processor, a core, an integrated circuit (IC), or the like that executes an application program. The communication processing unit is a processor, a core, an IC, or the like that communicates with one or more on-board apparatuses with a first communication protocol and a second communication protocol different from the first communication protocol, generates relay data including multiple pieces of data received from the on-board apparatuses, and transmits the generated relay data to the application processing unit. The communication processing unit compiles multiple pieces of first data received with the first communication protocol and adds one piece of first additional information thereto, adds second additional information to each piece of second data received with the second communication protocol, and compiles multiple pieces of first data having the first additional information added thereto and one or more pieces of second data each having the second additional information added thereto to generate relay data. Thus, it is expected that the load of processing by the communication processing unit will be reduced compared to a case in which first additional information is added to each one of multiple pieces of first data.

Preferably, the generation unit: compiles multiple pieces of second data each having the second additional information added thereto and further adds third additional information thereto; and generates the relay data, in which first data having the first additional information added thereto and second data having the second additional information and the third additional information added thereto are compiled.

In the present aspect, the communication processing unit compiles multiple pieces of second data each having the second additional information added thereto and further adds one piece of third additional information thereto, and generates relay data by compiling first data having the first additional information added thereto and second data having the second additional information and the third additional information added thereto. Thus, the communication processing unit of the on-board communication apparatus can generate relay data in a state in which information common to multiple pieces of second data, etc., is included in the third additional information.

Preferably, each of the first additional information and the second additional information includes information for identifying a communication protocol, and the third additional information includes information relating to the number of pieces of the second data included in the relay data.

In the present aspect, each of the first additional information and the second additional information added by the communication processing unit of the on-board communication apparatus includes information for identifying a communication protocol with which data having the additional information added thereto was received. Furthermore, the third additional information includes information relating to the number of pieces of second data included in relay data. Thus, the application processing unit receiving relay data generated by the communication processing unit can determine the number of pieces of second data included in the relay data based on the third additional information, and can determine, based on the first additional information or the second additional information, the communication protocol with which each piece of data was transmitted and received.

Preferably, the generation unit generates, as the relay data, data obtained by compiling first data having the first additional information added thereto and second data having the second additional information and the third additional information added thereto, and adding fourth additional information thereto, and the fourth additional information includes information relating to the number of pieces of the first and second data included in the relay data.

In the present aspect, the communication processing unit generates, as relay data, data by compiling first data having the first additional information added thereto and second data having the second additional information and the third additional information added thereto and adding the fourth additional information thereto. Thus, the communication processing unit can generate relay data in a state in which information common to first data and second data, etc., is included in the fourth additional information.

Preferably, the application processing unit includes: a plurality of data management units that manage data of respective communication protocols; and a distribution unit that distributes the first data and the second data included in relay data received from the communication processing unit to the data management units of corresponding communication protocols based on the first additional information and the second additional information included in the relay data.

In the present aspect, the application processing unit of the on-board communication apparatus includes a plurality of data management units that manage data of respective communication protocols. The application processing unit distributes first data and second data included in relay data received from the communication processing unit to the plurality of data management units based on the first additional information and the second additional information. Thus, the application processing unit is expected to manage data received from another apparatus using the appropriate data management unit.

Preferably, the first communication protocol is a communication protocol with which the largest quantity of data is received by the communication processing unit.

In the present embodiment, the first communication protocol, in the case of which multiple pieces of data are compiled and the first additional information is added thereto, is the communication protocol with which the largest quantity of data is received by the communication processing unit. Thus, it is expected that the number of pieces of additional information to be added to generate relay data will be reduced, and the load of processing by the communication processing unit will be reduced.

An on-board communication system according to the present aspect includes: an application processing apparatus that executes an application program; and a communication processing apparatus that includes: a first communication unit that communicates with one or more on-board apparatuses with a first communication protocol; one or more second communication units that communicate with one or more on-board apparatuses with a second communication protocol that is different from the first communication protocol; a generation unit that generates relay data including first data received by the first communication unit and second data received by the second communication units; and a relay unit that transmits the generated relay data to the application processing apparatus, wherein the generation unit: compiles multiple pieces of first data received by the first communication unit and adds first additional information thereto; adds second additional information to each piece of second data received by the second communication units; and generates the relay data, in which first data having the first additional information added thereto and one or more pieces of second data each having the second additional information added thereto are compiled.

One example of the application processing apparatus is an ECU that can execute an application program. Furthermore, one example of the communication processing apparatus is a gateway ECU.

In the present embodiment, it is expected that the load of processing by the communication processing apparatus will be reduced, as is the case with aspect (1).

A communication processing apparatus according to the present aspect includes: a first communication unit that communicates with one or more on-board apparatuses with a first communication protocol; one or more second communication units that communicate with one or more on-board apparatuses with a second communication protocol that is different from the first communication protocol; a generation unit that generates relay data including first data received by the first communication unit and second data received by the second communication units; and a relay unit that transmits the generated relay data to an application processing apparatus that executes an application program, wherein the generation unit; compiles multiple pieces of first data received by the first communication unit and adds first additional information thereto; adds second additional information to each piece of second data received by the second communication units; and generates the relay data, in which first data having the first additional information added thereto and one or more pieces of second data each having the second additional information added thereto are compiled.

In the present embodiment, it is expected that the load of processing by the communication processing apparatus will be reduced, as is the case with aspect (1).

In a communication method according to the present aspect, a communication processing apparatus including a first communication unit that communicates with one or more on-board apparatuses with a first communication protocol and one or more second communication units that communicate with one or more on-board apparatuses with a second communication protocol that is different from the first communication protocol: compiles multiple pieces of first data received by the first communication unit and adds first additional information thereto; adds second additional information to each piece of second data received by the second communication units; and generates relay data in which first data having the first additional information added thereto and one or more pieces of second data each having the second additional information added thereto are compiled; and transmits the relay data to an application processing apparatus that executes an application program.

In the present embodiment, it is expected that the load of processing by the communication processing apparatus will be reduced, as is the case with aspect (1).

A specific example of an on-board communication apparatus according to an embodiment of the present disclosure will be described in the following with reference to the drawings. The present disclosure is not limited to these examples; that is, the present disclosure is indicated by the claims, and is intended to include all modifications that are within the meaning and scope of equivalents of the claims.

System Configuration

FIG. 1 is a schematic diagram illustrating a configuration of an on-board system according to the present embodiment. The on-board system according to the present embodiment is a system in which an on-board communication apparatus 3 installed in a vehicle 1 collects various types of information from one or more other ECUs 4, and transmits the collected information to a server apparatus 2 that is provided outside the vehicle 1. In the vehicle 1 according to the present embodiment, a plurality of ECUs 4 that perform various types of processing, such as control processing relating to the travel of the vehicle 1, information processing for collecting information about the surroundings of the vehicle 1, or processing for providing information to a user, for example, are installed in appropriate locations. These ECUs 4 are connected through communication lines disposed within the vehicle 1, and operate cooperatively by transmitting and receiving data to and from one another and thereby exchanging data through these communication lines.

Furthermore, these ECUs 4 are connected to the on-board communication apparatus 3 through communication lines. The on-board system illustrated in FIG. 1 has a network configuration in which three communication lines are connected to the on-board communication apparatus 3, and three ECUs 4 are connected to each of the communication lines. That is, three ECUs 4 are connected to one communication line in a bus network configuration, and three communication lines each forming this bus network are connected to the on-board communication apparatus 3 in a star network configuration. However, the illustrated network configuration is one example, and there is no limitation to this; the on-board communication apparatus 3 and the plurality of ECUs 4 installed in the vehicle 1 may be connected in various network configurations, such as a bus, star, or ring network configuration, for example.

The on-board communication apparatus 3 relays the transmission and reception of data between a plurality of communication lines connected thereto, and also relays the transmission and reception of data between the server apparatus 2 provided outside the vehicle 1 and ECUs 4 inside the vehicle 1. For example, the on-board communication apparatus 3 relays the transmission and reception of data between ECUs 4 installed in the vehicle 1 by transmitting data received from one communication line through one or more other communication lines. Furthermore, for example, the on-board communication apparatus 3 relays the transmission and reception of data between the server apparatus 2 and ECUs 4 by transmitting data received from the server apparatus 2 through one or more communication lines. Furthermore, for example, the on-board communication apparatus 3 relays the transmission and reception of data between the server apparatus 2 and ECUs 4 by transmitting data received from ECUs 4 to the server apparatus 2.

Apparatus Configuration

Figure 2:
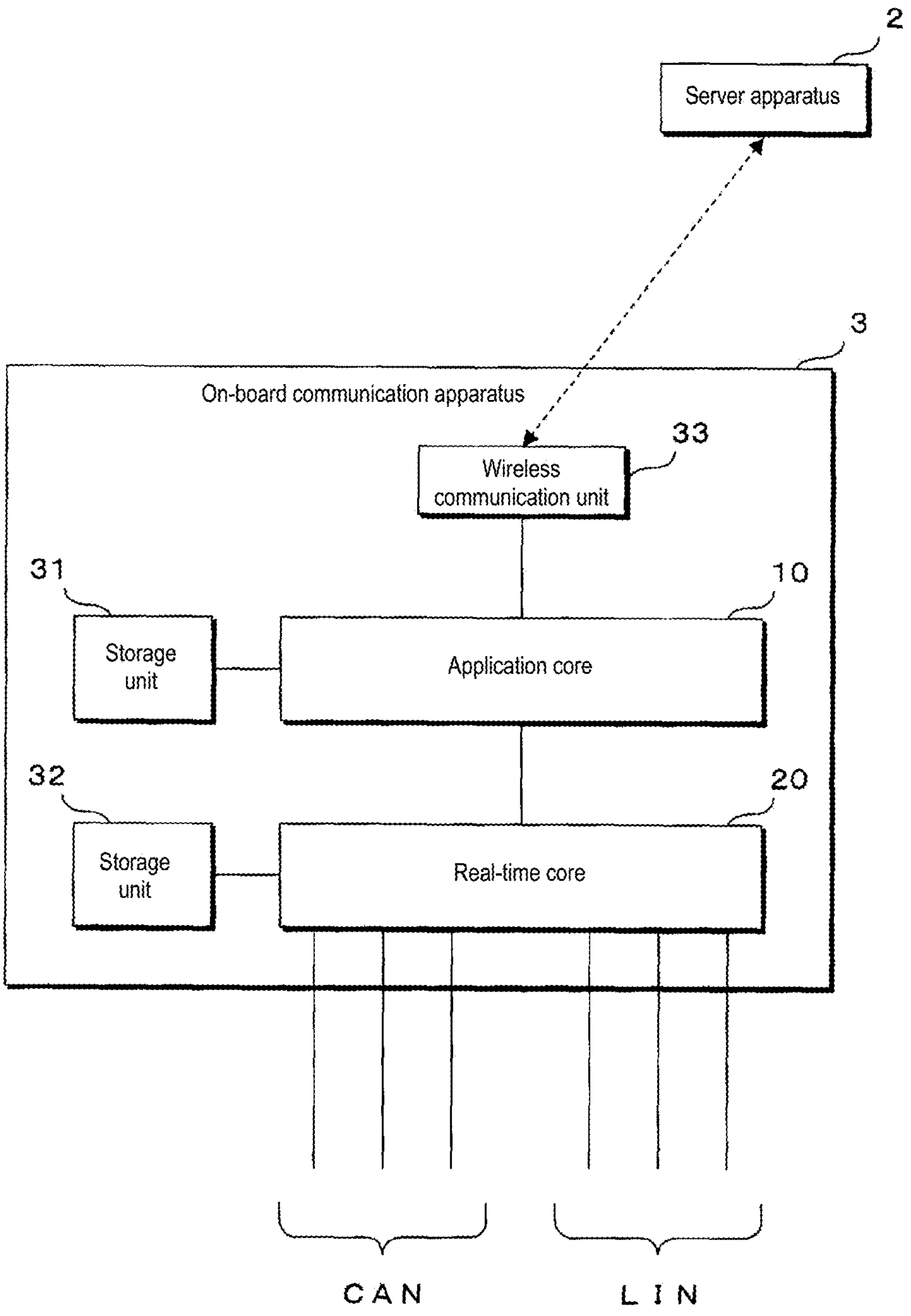
FIG. 2 is a block diagram illustrating a hardware configuration of an on-board communication apparatus according to the present embodiment.

FIG. 2 is a block diagram illustrating a hardware configuration of the on-board communication apparatus 3 according to the present embodiment. The on-board communication apparatus 3 according to the present embodiment is formed to include an application core 10, a real-time core 20, storage units 31 and 32, a wireless communication unit 33, etc. In the present embodiment, each of the cores included in the on-board communication apparatus 3 is, for example, an IC in which an computation processing unit such as a central processing unit (CPU) or a micro-processing unit (MPU), a storage unit such as a static random access memory (SRAM) or a dynamic random access memory (DRAM), one or more communication units that perform communication with a communication protocol such as CAN, LIN, or Ethernet (registered trademark), etc., are integrated into a single package. Note that, in the present embodiment, the on-board communication apparatus 3 includes two cores, i.e., the application core 10 and the real-time core 20; these two cores are so-called single-core ICs, and the IC constituting the application core 10 and the IC constituting the real-time core 20 are mounted on a circuit board, etc., of the on-board communication apparatus 3. However, the on-board communication apparatus 3 may be equipped with a so-called multi-core IC, and the application core 10 and the real-time core 20 may be included in a single IC.

For example, each of the storage units 31 and 32 is formed using a non-volatile memory element such as a flash memory or an electrically erasable programmable read-only memory (EEPROM). The storage unit 31 stores various computer programs such as an OS and an application program to be executed by the application core 10, and data necessary for the execution of these computer programs. The storage unit 32 stores various computer programs such as a real-time OS and a communication program to be executed by the real-time core 20, and data necessary for the execution of these computer programs. Note that, while a configuration in which the on-board communication apparatus 3 includes the storage units 31 and 32 for the respective cores is adopted in the present embodiment, there is no limitation to this; a configuration in which a single storage unit is shared by the application core 10 and the real-time core 20 may be adopted.

For example, the wireless communication unit 33 communicates with the server apparatus 2 provided outside the vehicle 1 using wireless communication such as a mobile-phone communication network or a wireless local area network (LAN). Note that the wireless communication unit 33 may communicate with various apparatuses provided outside the vehicle 1, besides the server apparatus 2. The wireless communication unit 33 transmits data provided from the application core 10 to the server apparatus 2, and also provides the application core 10 with data received from the server apparatus 2. For example, the wireless communication unit 33 is mounted on the circuit board of the on-board communication apparatus 3 as a single IC, and can exchange data with the application core 10 through wiring provided on the circuit board. However, the wireless communication unit 33 may be provided inside the application core 10.

For example, the application core 10 included in the on-board communication apparatus 3 according to the present embodiment is a core that executes an application program, and the real-time core 20 included in the on-board communication apparatus 3 is a core that performs relay processing relating to communication within the vehicle 1. For example, the application core 10 and the real-time core 20 are mounted on the circuit board of the on-board communication apparatus 3, are electrically connected to one another through wiring provided on the circuit board, and can exchange data with one another through this wiring. In the present embodiment, the application core 10 and the real-time core 20 exchange data by performing communication with a communication protocol such as Ethernet or Serial Peripheral Interface (SPI) through this wiring.

The real-time core 20 communicates with one or more ECUs 4 provided inside the vehicle 1 through one or more communication lines connected to the on-board communication apparatus 3. In the illustrated example, three communication lines conforming to the CAN communication protocol and three communication lines conforming to the LIN communication protocol are connected to the on-board communication apparatus 3. For example, these communication lines are connected to one or more connectors provided to the circuit board of the on-board communication apparatus 3, and these connectors and the real-time core 20 are electrically connected through wiring provided on the circuit board. The real-time core 20 relays the transmission and reception of data between ECUs 4 connected to these communication lines, and also relays the transmission and reception of data between the application core 10 and ECUs 4.

Figure 3:
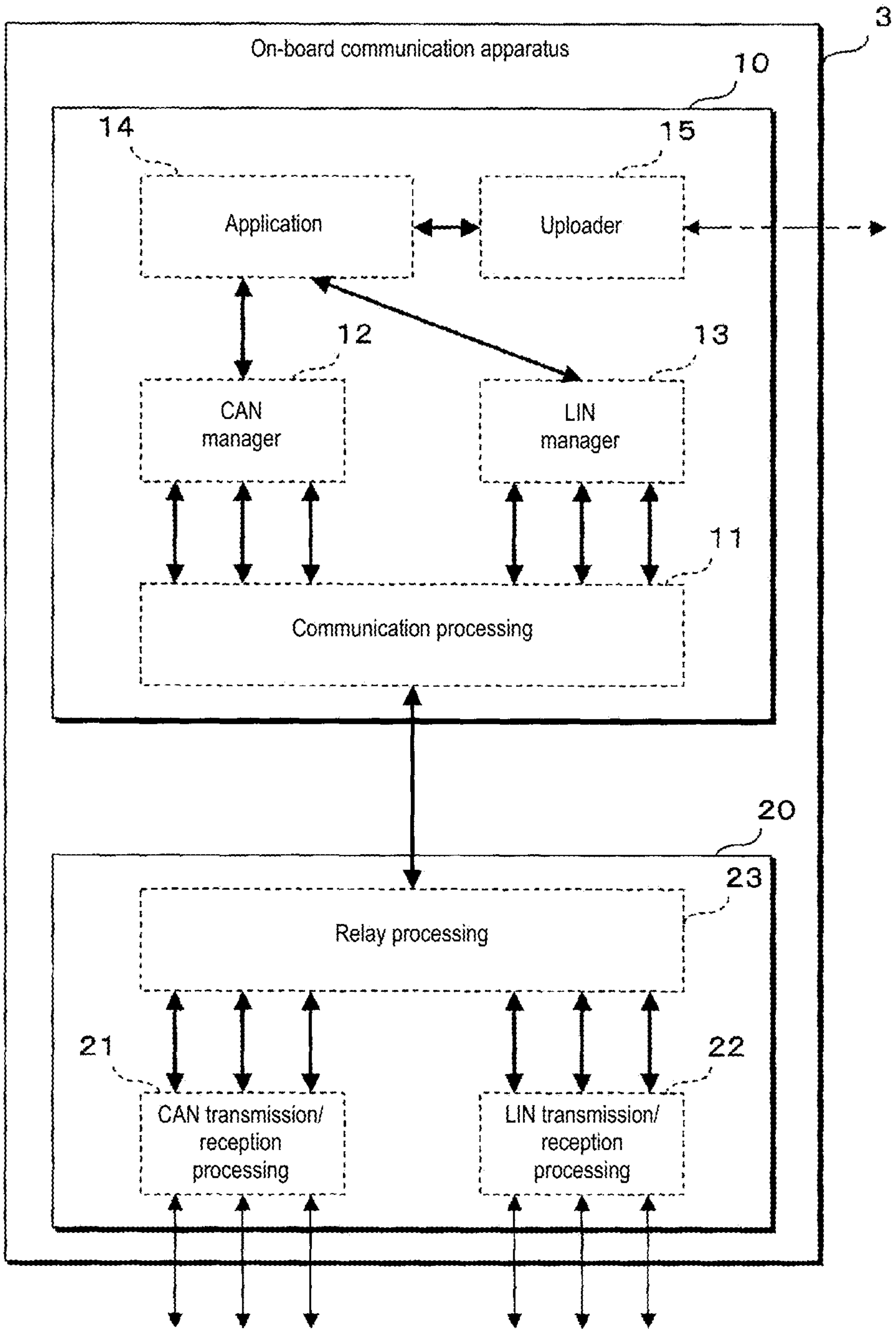
FIG. 3 is a block diagram illustrating a software configuration of the on-board communication apparatus according to the present embodiment.

FIG. 3 is a block diagram illustrating a software configuration of the on-board communication apparatus 3 according to the present embodiment. In the on-board communication apparatus 3 according to the present embodiment, the software modules indicated by the dashed blocks in FIG. 3 are realized as a result of the application core 10 and the real-time core 20 executing programs stored in the storage units 31 and 32. Note that, while the modules indicated by dashed blocks in FIG. 3 are software modules that are realized as a result of programs being executed in the present embodiment, there is no limitation to this; the modules may be hardware modules implemented as hardware.

In the present embodiment, the application core 10 includes a communication processing module 11, a CAN manager module 12, a LIN manager module 13, an application module 14, an uploader module 15, etc. Furthermore, the real-time core 20 includes a CAN transmission/reception processing module 21, a LIN transmission/reception processing module 22, a relay processing module 23, etc. Note that, in FIG. 3, the names of the blocks are indicated in a state in which "module" is omitted therefrom.

The CAN transmission/reception processing module 21 of the real-time core 20 is a module for performing communication based on the CAN communication protocol with ECUs 4 inside the vehicle 1. The CAN transmission/reception processing module 21 receives data (messages, frames, etc.) conforming to the CAN communication protocol from ECUs 4 through communication lines, and provides the received data to the relay processing module 23. Furthermore, the CAN transmission/reception processing module 21 converts data provided from the relay processing module 23 into data conforming to the CAN communication protocol, and transmits the converted data to ECUs 4.

The LIN transmission/reception processing module 22 is a module for performing communication based on the LIN communication protocol with ECUs 4 inside the vehicle 1. The LIN transmission/reception processing module 22 receives data conforming to the LIN communication protocol from ECUs 4 through communication lines, and provides the received data to the relay processing module 23. Furthermore, the LIN transmission/reception processing module 22 converts data provided from the relay processing module 23 into data conforming to the LIN communication protocol, and transmits the converted data to ECUs 4.

The relay processing module 23 performs processing for relaying the transmission and reception of data between the CAN transmission/reception processing module 21, the LIN transmission/reception processing module 22, and the application core 10. For example, the relay processing module 23 relays data between CAN and LIN within the vehicle 1 by transmitting data received from the CAN transmission/reception processing module 21 to the LIN transmission/reception processing module 22, and also transmitting data received from the LIN transmission/reception processing module 22 to the CAN transmission/reception processing module 21. Furthermore, for example, the relay processing module 23 relays data between the application core 10 and the ECUs 4 inside the vehicle 1 by transmitting data received from the CAN transmission/reception processing module 21 or the LIN transmission/reception processing module 22 to the application core 10, and also transmitting data received from the application core 10 to the CAN transmission/reception processing module 21 or the LIN transmission/reception processing module 22.

Furthermore, the relay processing module 23 of the real-time core 20 included in the on-board communication apparatus 3 according to the present embodiment generates relay data obtained by compiling, into one, multiple pieces of data that the CAN transmission/reception processing module 21 and the LIN transmission/reception processing module 22 have received from one or more ECUs 4, and transmits the generated relay data to the application core 10. The relay data generation processing by the relay processing module 23 will be described in detail later.

The communication processing module 11 of the application core 10 transmits and receives data to and from the real-time core 20. The communication processing module 11 transmits data received from the real-time core 20 to the CAN manager module 12 or the LIN manager module 13, and also transmits data received from the CAN manager module 12 or the LIN manager module 13 to the real-time core 20.

The CAN manager module 12 is a module that manages data that the on-board communication apparatus 3 has received from ECUs 4 with the CAN communication protocol. The CAN manager module 12 virtually provides the application module 14 with a CAN communication protocol-based communication function performed by the on-board communication apparatus 3. Thus, the application module 14 can transmit and receive data to and from ECUs 4 installed in the vehicle 1 by transmitting and receiving data to and from the CAN manager module 12. The CAN manager module 12 provides data provided from the communication processing module 11 to the application module 14, and also provides data provided from the application module 14 to the communication processing module 11.

The LIN manager module 13 is a module that manages data that the on-board communication apparatus 3 has received from ECUs 4 with the LIN communication protocol. The LIN manager module 13 virtually provides the application module 14 with a LIN communication protocol-based communication function performed by the on-board communication apparatus 3. Thus, the application module 14 can transmit and receive data to and from ECUs 4 installed in the vehicle 1 by transmitting and receiving data to and from the LIN manager module 13. The LIN manager module 13 provides data provided from the communication processing module 11 to the application module 14, and also provides data provided from the application module 14 to the communication processing module 11.

The application module 14 is a module that performs various types of processing such as the provision of information to the driver of the vehicle 1, the transmission of information to the outside of the vehicle 1, etc., for example, based on data collected from the ECUs 4 installed in the vehicle 1. While only one application module 14 is illustrated in FIG. 3, a plurality of application modules 14 may be executed in parallel as the application module 14. The application module 14 according to the present embodiment transmits data within the vehicle 1 to the server apparatus 2 outside the vehicle 1, and also performs processing for transmitting data received from the server apparatus 2 to the ECUs 4 in the vehicle 1. The application module 14 can transmit data to the server apparatus 2 by receiving data from the CAN manager module 12 or the LIN manager module 13 and transmitting the data to the uploader module 15 after applying appropriate processing to the received data. Furthermore, by receiving data from the uploader module 15 and transmitting the data to the CAN manager module 12 or the LIN manager module 13 in a state in which an appropriate port number is designated, the application module 14 can transmit the data to ECUs 4 connected to the corresponding CAN or LIN communication line.

The uploader module 15 is a module that communicates with the server apparatus 2 by controlling the operation of the wireless communication unit 33. In the present embodiment, the uploader module 15 receives data from the application module 14, and transmits (uploads) the received data to the server apparatus 2. Furthermore, upon receiving some data from the server apparatus 2 as a response to data transmission, the uploader module 15 may transmit the received data to the application module 14.

Relay Data Generation Processing

Figure 4:
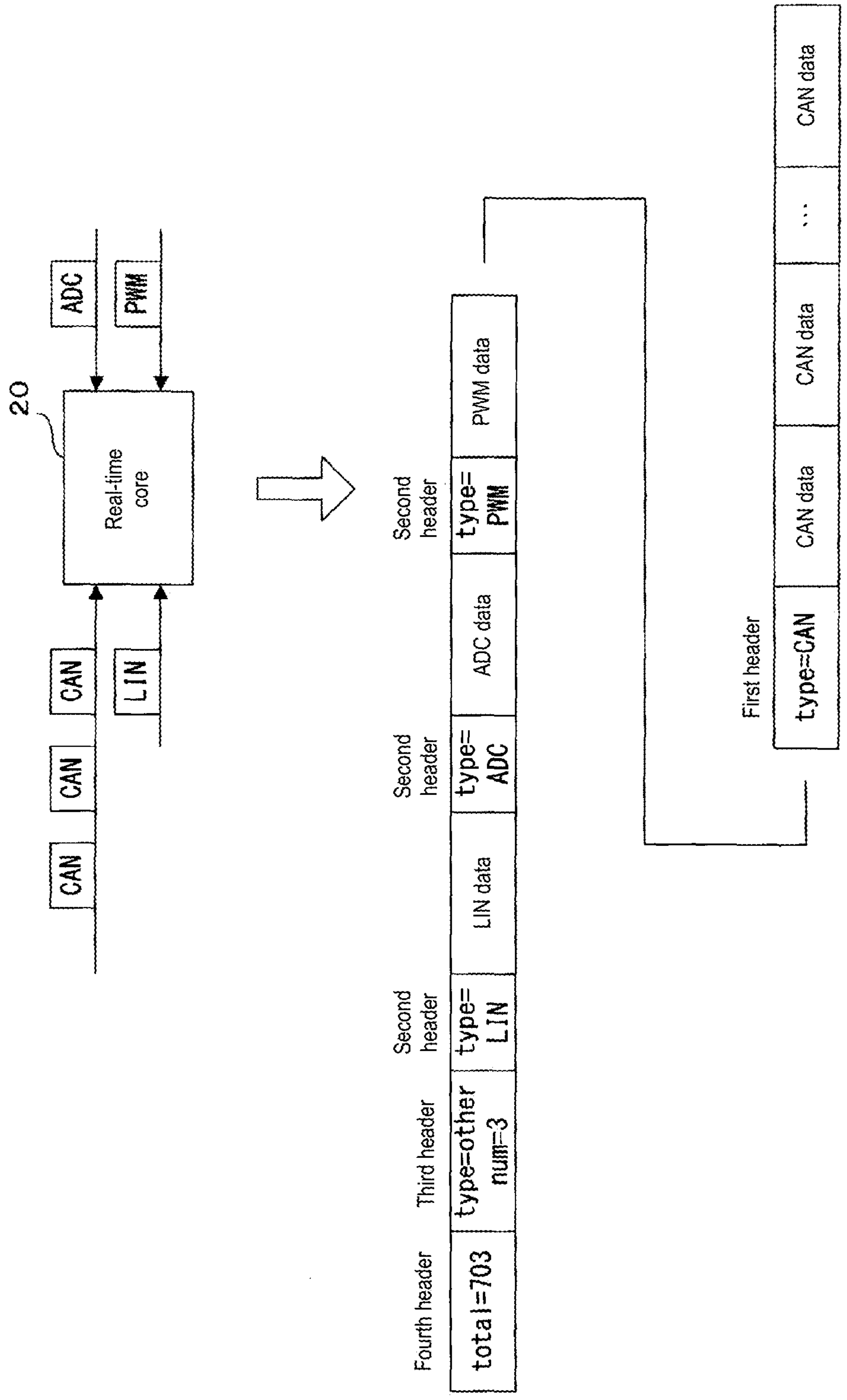
FIG. 4 is a schematic diagram for describing relay data generation processing.

The real-time core 20 included in the on-board communication apparatus 3 according to the present embodiment communicates with the plurality of ECUs 4 installed in the vehicle 1 with various communication protocols, generates a single piece of relay data by compiling (packing) multiple pieces of data received from the ECUs 4, and transmits the generated relay data to the application core 10. FIG. 4 is a schematic diagram for describing the relay data generation processing. Note that, in FIG. 4, an example is illustrated in which the real-time core 20 receives data with analog-to-digital conversion (ADC) and pulse width modulation (PWM) communication protocols besides the CAN and LIN communication protocols. The communication protocols in present the embodiment include data transmission/reception standards such as ADC and PWM.

The real-time core 20 according to the present embodiment can transmit and receive data to and from the ECUs 4, etc., with a plurality of communication protocols such as CAN, LIN, ADC, and PWM. In order to relay data received from the ECUs 4, etc., with these communication protocols to the application core 10, the real-time core 20 temporarily accumulates received data in communication buffers, and collectively transmits multiple pieces of data stored in the communication buffers to the application core 10 at a predetermined timing as relay data. Note that the communication buffers are provided in a storage area inside the real-time core 20 or in the storage unit 32. Furthermore, in the present embodiment, the on-board communication apparatus 3 is provided with at least two communication buffers, one for storing data for a first communication protocol and the other for storing data for second communication protocols.

In the present embodiment, the plurality of communication protocols with which the real-time core 20 communicates with the ECUs 4, etc., are classified in advance into one first communication protocol and one or more second communication protocols, which are communication protocols other than the first communication protocol. In the present embodiment, the CAN communication protocol is the first communication protocol, and the communication protocols other than the CAN communication protocol, i.e., the LIN, ADC, and PWM communication protocols, are classified as second communication protocols. For example, this classification of the first and second communication protocols is determined in advance by a designer or the like of the on-board communication apparatus 3 or the on-board system. In the present embodiment, the communication protocol with which the real-time core 20 receives the greatest quantity of data (or with which the greatest quantity of data is transmitted and received within the vehicle 1) is set as the first communication protocol, and, in the present example, the real-time core 20 receives the greatest quantity of data with the CAN communication protocol. All communication protocols other than the first communication protocol, i.e., the LIN, ADC, and PWM communication protocols in the present example, are set as second communication protocols.

Upon receiving data from an ECU 4 or the like, the real-time core 20 stores the data to the communication buffer for the first communication protocol if the data has been received with the first communication protocol (CAN), and stores the data to the communication buffer for the second communication protocols if the data has been received with a second communication protocol (LIN, ADC, PWM). In doing so, for each piece of data received with a second communication protocol, the real-time core 20 stores the data in the communication buffer in a state in which additional information (second header) indicating the communication protocol (LIN, ADC, PWM) with which the data was received is added thereto.

The real-time core 20 repeats the transmission of relay data to the application core 10 at a predetermined cycle, for example. When a timing when relay data is to be transmitted arrives, the real-time core 20 reads data stored in the communication buffers and generates relay data. In doing so, the real-time core 20 adds, to multiple pieces of data received with the first communication protocol, additional information (first header) indicating the communication protocol (CAN) with which the multiple pieces of data were received. Furthermore, the real-time core 20 adds, to multiple pieces of data that were received with the second communication protocols and that each have a second header added thereto, additional information (third header) that indicates that the multiple pieces of data were received with the second communication protocols and indicates the data count of the multiple pieces of data. Furthermore, the real-time core 20 adds additional information (fourth header) indicating the total data count included in the relay data, and generates the relay data by compiling such additional information and data.

For example, in the relay data illustrated in the bottom part of FIG. 4, a fourth header, a third header, multiple sets of a second header and data received with a second communication protocol, a first header, and multiple pieces of data received with the first communication protocol are connected in this order. The real-time core 20 generates the relay data by connecting data stored in the communication buffers and the first to fourth headers in the illustrated order. However, the order of the headers and data included in the relay data illustrated in FIG. 4 is one example, and there is no limitation to this; headers and data may be arranged in any order. The real-time core 20 transmits the generated relay data to the application core 10.

The application core 10 receives the relay data transmitted from the real-time core 20. Having received the relay data, the application core 10 ascertains, based on the third header, that the relay data includes three pieces of data based on communication protocols other than CAN, and acquires three sets of a second header and data arranged after the third header, for example. For each acquired set of a second header and data, the application core 10 determines the communication protocol corresponding to the data based on the second header, and provides the data to the manager module corresponding to the communication protocol (for example the LIN manager module 13, or the like).

Furthermore, the application core 10 can determine, based on the fourth header, that the total data count included in the relay data is 703, and can determine, based on the third header, that the number of pieces of data based on communication protocols other than CAN is 3, whereupon the application core 10 can determine that 700 pieces of data based on the CAN communication protocol are included in the relay data. The application core 10 acquires the 700 pieces of data following the first header from the relay data, and provides the data to the CAN manager module 12 corresponding to the CAN communication protocol.

Flowchart

Figure 5:
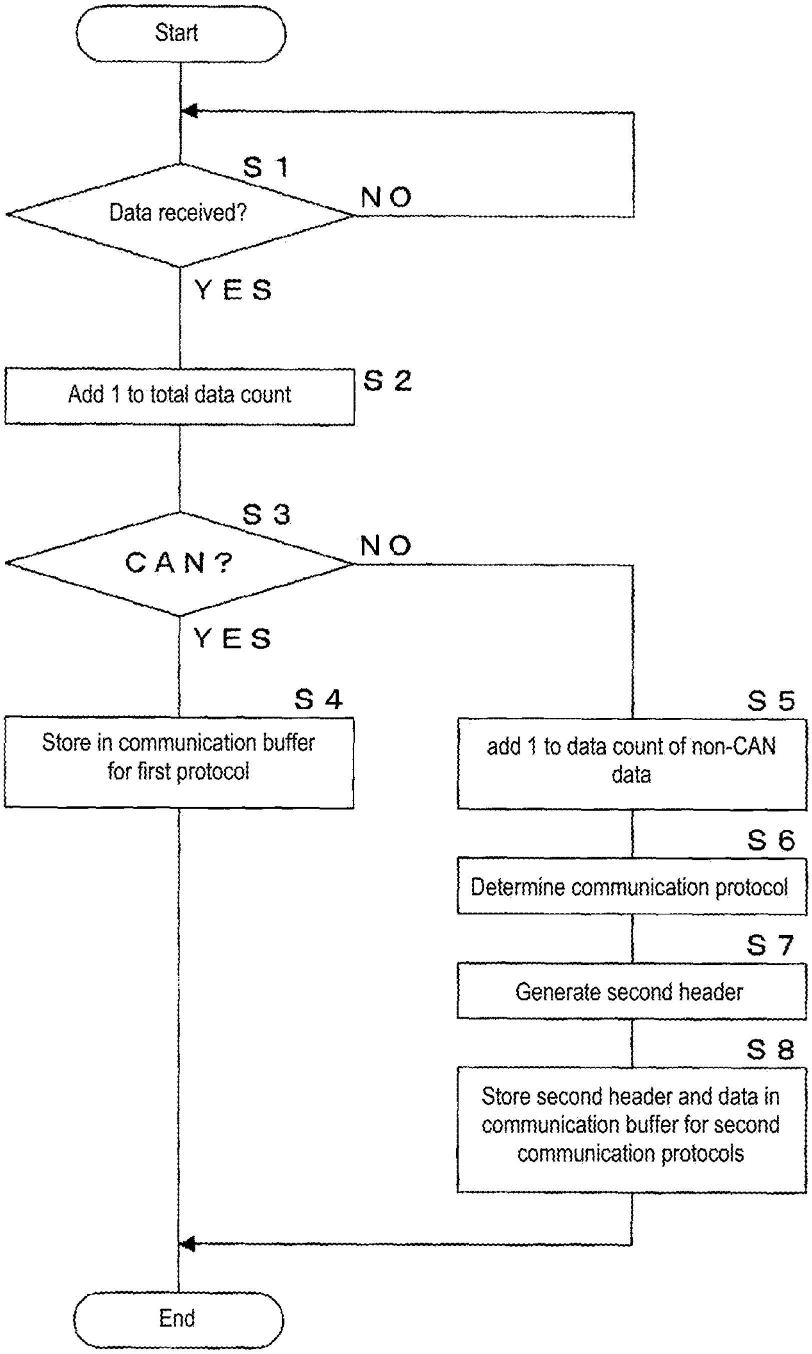
FIG. 5 is a flowchart illustrating a procedure of processing during reception performed by a real-time core according to the present embodiment.

FIG. 5 is a flowchart illustrating a procedure of processing during reception performed by the real-time core 20 according to the present embodiment. Note that the real-time core 20 performs processing for counting the total data count and the data count of non-CAN data in the present flowchart, and this processing may be performed using variables for counting utilizing registers or a storage area such as a memory included in the real-time core 20. The total data count indicates the number of pieces of data included in relay data, and the data count of non-CAN data indicates the number of pieces of data other than CAN data included in relay data.

The real-time core 20 included in the on-board communication apparatus 3 according to the present embodiment determines whether or not data has been received from an on-board apparatus installed in the vehicle 1, such as an ECU 4 (step S1). If data has not been received (S1: NO), the real-time core 20 waits until data is received. If data has been received (S1: YES), the real-time core 20 adds 1 to the total data count (step S2).

The real-time core 20 determines whether or not the received data is based on the CAN communication protocol (step S3). If the received data is based on the CAN communication protocol (S3: YES), the real-time core 20 stores the received data in the communication buffer for the first communication protocol (CAN) (step S4) and terminates processing.

If the received data is not based on the CAN communication protocol (S3: NO), the real-time core 20 adds 1 to the data count of non-CAN data (step S5). The real-time core 20 determines which communication protocol the received data is based on (step S6). The real-time core 20 generates a second header including information indicating the communication protocol determined in step S6 (step S7). The real-time core 20 stores the received data and the second header generated in step S7 in the communication buffer for the second communication protocols (non-CAN protocols) (step S8) and terminates processing.

Figure 6:
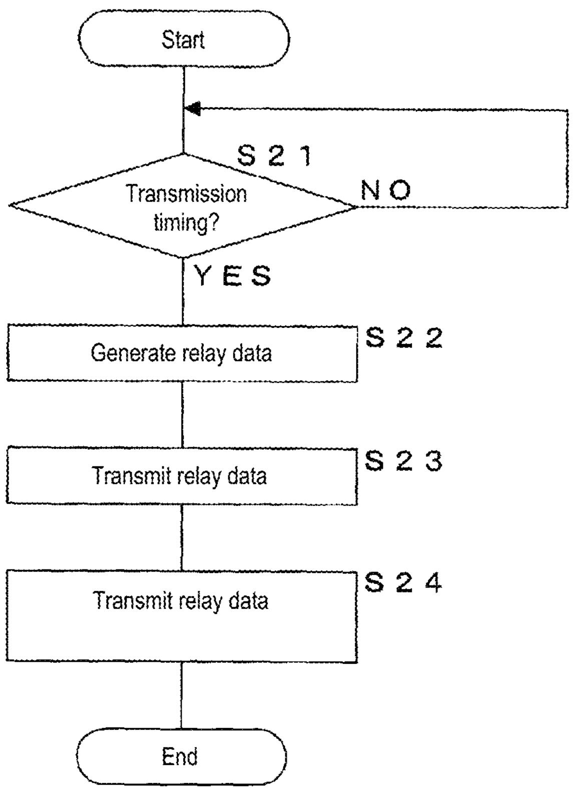
FIG. 6 is a flowchart illustrating a procedure of processing during transmission performed by the real-time core according to the present embodiment.

FIG. 6 is a flowchart illustrating a procedure of processing during transmission performed by the real-time core 20 according to the present embodiment. The real-time core 20 included in the on-board communication apparatus 3 according to the present embodiment periodically repeats data transmission to the application core 10, and determines whether or not a timing for transmitting data to the application core 10 has arrived (step S21). If a data transmission timing has not arrived yet (S21: NO), the real-time core 20 waits until a data transmission timing arrives.

If a data transmission timing has arrived (S21: YES), the real-time core 20 generates relay data to be transmitted to the application core 10 based on data stored in the communication buffers (step S22). Here, the real-time core 20 adds a first header indicating the CAN communication protocol to multiple pieces of data stored in the communication buffer for the first communication protocol. Furthermore, the real-time core 20 adds a third header indicating non-CAN communication protocols and the data count of included pieces of data with respect to multiple sets of a second header and data stored in the communication buffer for second communication protocols. The real-time core 20 generates, as relay data, data by connecting the multiple pieces of data based on the CAN communication protocol having the first header added thereto and the multiple sets of a second header and data having the third header added thereto, and adding a fourth header indicating the total data count thereto (see FIG. 4).

The real-time core 20 transmits the generated relay data to the application core 10 (step S23). The real-time core 20 resets the counted values of the total data count and the data count of non-CAN data (step S24) and terminates processing.

Figure 7:
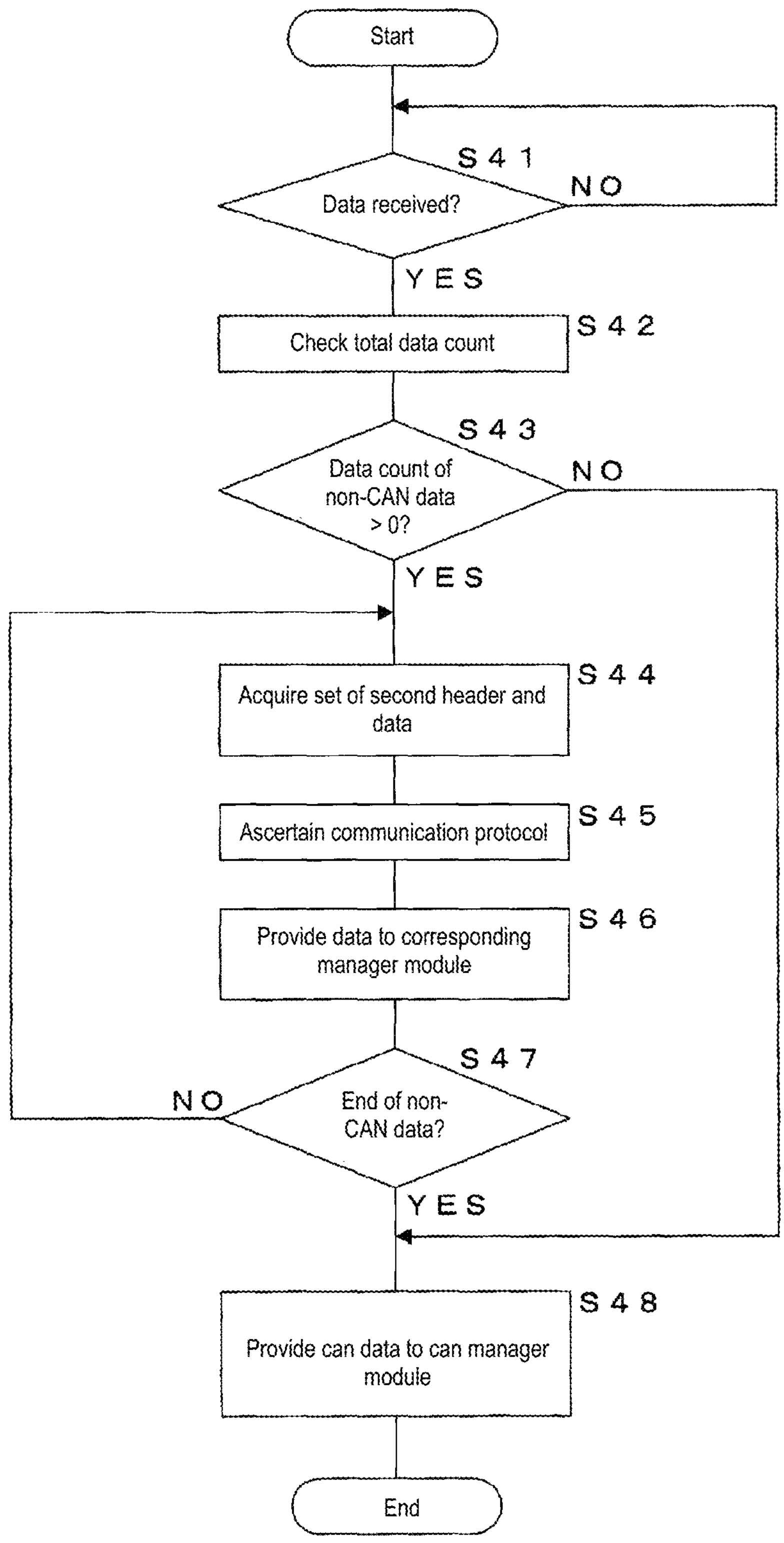
FIG. 7 is a flowchart illustrating a procedure of processing performed by an application core according to the present embodiment.

FIG. 7 is a flowchart illustrating a procedure of processing performed by the application core 10 according to the present embodiment. The application core 10 included in the on-board communication apparatus 3 according to the present embodiment determines whether or not relay data has been received from the real-time core 20 (step S41). If relay data has not been received (S41: NO), the application core 10 waits until relay data is received. If relay data has been received (S41: YES), the application core 10 checks the total data count included in the relay data based on the fourth header included in the relay data (step S42).

Next, based on the third header included in the relay data, the application core 10 determines whether or not the data count of data based on communication protocols other than the CAN communication protocol included in the relay data is more than 0 (step S43). If the data count of data based on communication protocols other than the CAN communication protocol is 0 (S43: NO), the application core 10 advances processing to step S48.

If the data count of data based on communication protocols other than the CAN communication protocol is more than 0 (S43: YES), the application core 10 acquires one set of a second header and data included in the received relay data (step S44). Based on the acquired second header, the application core 10 ascertains the communication protocol of the acquired data (step S45). The application core 10 provides the data acquired in step S44 to the manager module (for example, the LIN manager module 13) corresponding to the communication protocol ascertained in step S45 (step S46). The application core 10 determines whether or not the processing in steps S44 to S46 has been completed for all pieces of data based on communication protocols other than the CAN communication protocol (step S47). If the processing has not been completed for all pieces of data based on communication protocols other than the CAN communication protocol (S47: NO), the application core 10 returns processing to step S44 and performs similar processing on the next set of a second header and data. If the processing has been completed for all pieces of data based on communication protocols other than the CAN communication protocol (S47: YES), the application core 10 advances processing to step S48.

The application core 10 provides multiple pieces of data based on the CAN communication protocol following the first header included in the received relay data to the CAN manager module 12 (step S48) and terminates processing.

Modification

Figure 8:
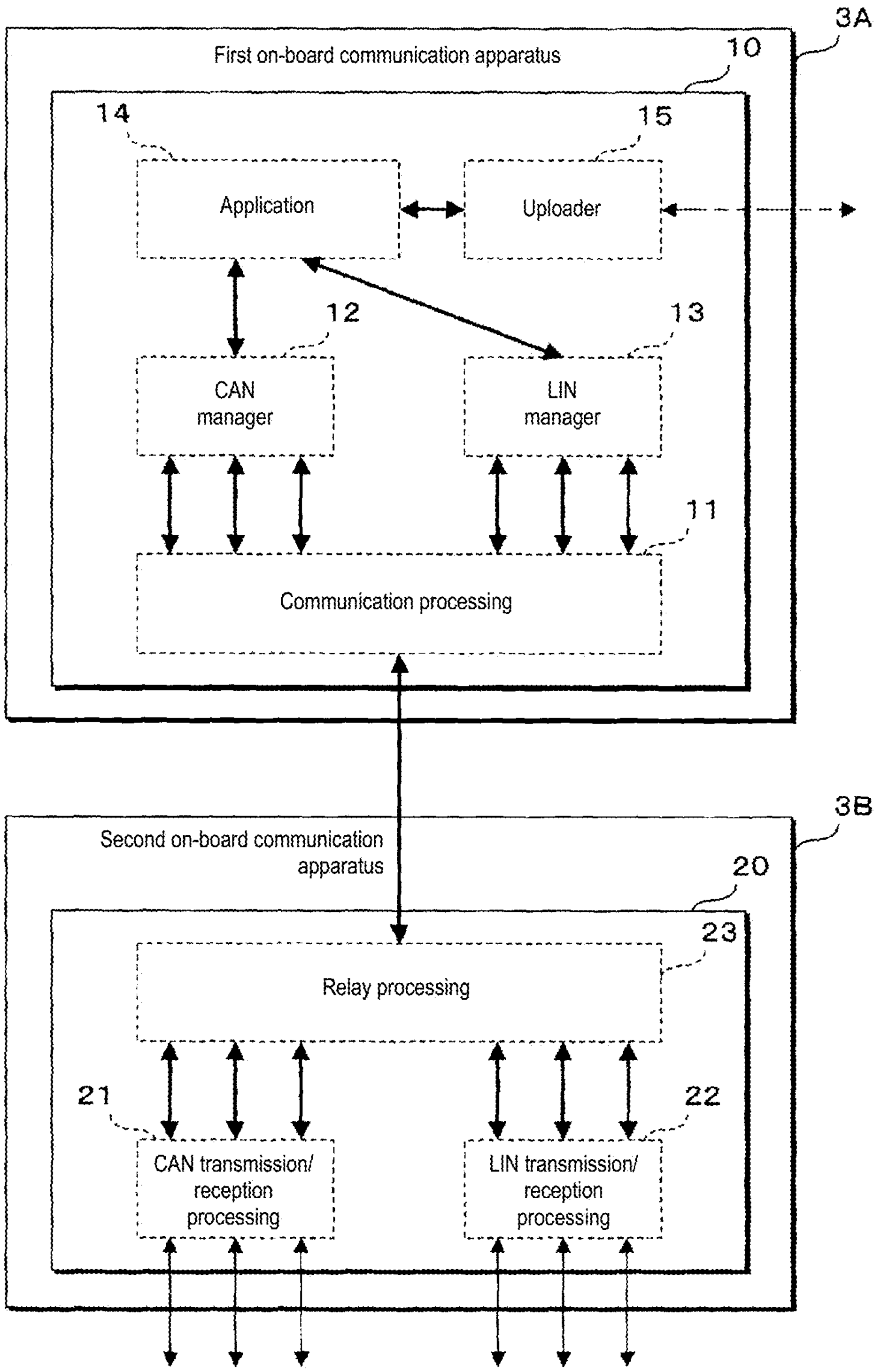
FIG. 8 is a block diagram illustrating a configuration of an on-board communication system according to a modification.

FIG. 8 is a block diagram illustrating a configuration of an on-board communication system according to a modification. The on-board communication system according to the modification includes a first on-board communication apparatus 3A that includes the application core 10 and a second on-board communication apparatus 3B that includes the real-time core 20. The first on-board communication apparatus 3A and the second on-board communication apparatus 3B are connected through a communication line. The communication processing module 11 of the application core 10 of the first on-board communication apparatus 3A and the relay processing module 23 of the real-time core 20 of the second on-board communication apparatus 3B can communicate with one another through this communication line.

As indicated by the modification, the application core 10 and the real-time core 20 may be separately installed in a plurality of on-board communication apparatuses instead of being installed in one on-board communication apparatus.

CONCLUSION

An on-board communication apparatus (on-board communication system) 3 according to the present embodiment having the above-described configuration includes an application core (application processing unit, application processing apparatus) 10 that executes an application program, and a real-time core (communication processing unit, communication processing apparatus) 20 that relays the transmission and reception of data between the application core 10 and ECUs (on-board apparatus) 4 that are installed in a vehicle 1. The real-time core 20 includes a CAN transmission/reception processing module (first communication unit) 21 that performs communication with a CAN communication protocol (first communication protocol), a LIN transmission/reception processing module (second communication unit) 22 that performs communication with a communication protocol (second communication protocol) that is different from the CAN communication protocol, and a relay processing module 23 that performs processing for relaying data. The real-time core 20 compiles multiple pieces of data (first data) received by the CAN transmission/reception processing module 21 and adds one first header (first additional information) thereto, and adds a second header (second additional information) to each piece of data (second data) received by the LIN transmission/reception processing module 22. The real-time core 20 generates relay data in which multiple pieces of first data having the first header added thereto and multiple pieces of second data each having the second header added thereto are compiled, and transmits the generated relay data to the application core 10. Thus, the on-board communication apparatus 3 is expected to reduce the load of processing performed by the real-time core 20 compared to a case in which the first header is added to each one of multiple pieces of first data.

Furthermore, the real-time core 20 of the on-board communication apparatus 3 according to the present embodiment compiles multiple pieces of second data each having the second header added thereto and further adds one third header (third additional information) thereto, generates relay data in which multiple pieces of first data having the first header added thereto and multiple pieces of second data having the second header and the third header added thereto are compiled, and transmits the generated relay data to the application core 10. Thus, the real-time core 20 of the on-board communication apparatus 3 can generate relay data in a state in which information common to multiple pieces of second data, etc., is included in the third header.

Furthermore, each of the first header and the second header added by the real-time core 20 of the on-board communication apparatus 3 according to the present embodiment includes information that identifies a communication protocol with which data having the header added thereto was received. Furthermore, the third header includes information relating to the number of pieces of second data included in relay data. Thus, the application core 10 receiving relay data generated by the real-time core 20 can determine the number of pieces of second data included in the relay data based on the third header, and can determine, based on the first header or the second header, the communication protocol with which each piece of data was transmitted and received.

Furthermore, the real-time core 20 of the on-board communication apparatus 3 according to the present embodiment generates, as the relay data, data obtained by compiling first data having the first header added thereto and second data having the second header and the third header added thereto, and adding a fourth header (fourth additional information) thereto. Thus, the real-time core 20 can generate relay data in a state in which information common to first data and second data, etc., is included in the fourth header.

Furthermore, the application core 10 of the on-board communication apparatus 3 according to the present embodiment includes a plurality of manager modules (data management units) that manage data of respective communication protocols. The application core 10 distributes multiple pieces of data included in relay data received from the real-time core 20 to the plurality of manager modules based on the first header and the second header. Thus, the application core 10 is expected to manage data received from another apparatus using the appropriate manager module.

Furthermore, in the on-board communication apparatus 3 according to the present embodiment, the first communication protocol, in the case of which multiple pieces of data are compiled and the first header is added thereto, is the communication protocol (for example, the CAN communication protocol) with which the largest quantity of data is received by the real-time core 20. Thus, it is expected that the number of headers to be added to generate relay data will be reduced, and the load of processing by the real-time core 20 will be reduced.

Note that, while CAN, LIN, ADC, PWM, etc., have been mentioned in the present embodiment as communication protocols that the on-board communication apparatus 3 uses to communicate with other on-board apparatuses such as the ECUs 4, the communication protocols are not limited to these; for example, the on-board communication apparatus 3 may perform communication using various communication protocols, such as CAN with Flexible Data Rate (CAN-FD), FlexRay (registered trademark), or Ethernet. Furthermore, while an example in which an application program executed by the application core 10 performs processing for transmitting data to the server apparatus 2 outside the vehicle 1 has been described in the present embodiment, there is no limitation to this; any processing may be performed by the application program. Furthermore, while a configuration in which the on-board communication apparatus 3 includes the application core 10 and the real-time core 20 has been described, there is no limitation to this; the on-board communication system may be that having a configuration in which a first on-board communication apparatus including the application core 10 and a second on-board communication apparatus including the real-time core 20 are connected through a communication line.

Furthermore, while a designer or the like of the on-board system or the on-board communication apparatus 3 determines the first communication protocol and the second communication protocols, which are communication protocols other than the first communication protocol, in advance in the present embodiment, there is no limitation to this. The on-board communication apparatus 3 may dynamically change which communication protocol is to be treated as the first communication protocol. For example, the on-board communication apparatus 3 may count, for each communication protocol, the number of pieces of data received within a predetermined amount of time, and determine the communication protocol with which the greatest number of data is received as the first communication protocol.

The embodiments disclosed herein are examples in every way, and shall be construed as being non-limiting. The scope of the present disclosure is not limited to what is defined above; that is, the scope of the present disclosure is indicated by the claims, and is intended to include all modifications that are within the meaning and scope of equivalents of the claims.

The invention claimed is:

1. An on-board communication apparatus comprising:

an application processing unit that executes an application program; and a communication processing unit that includes: a first communication unit that communicates with one or more on-board apparatuses with a first communication protocol; one or more second communication units that communicate with one or more on-board apparatuses with a second communication protocol that is different from the first communication protocol; a generation unit that generates relay data including first data received by the first communication unit and second data received by the second communication units; and a relay unit that transmits the generated relay data to the application processing unit, wherein the generation unit:

compiles multiple pieces of first data received by the first communication unit and adds first additional information thereto;

adds second additional information to each piece of second data received by the second communication units; and generates the relay data, in which first data having the first additional information added thereto and one or more pieces of second data each having the second additional information added thereto are compiled.

2. The on-board communication apparatus according to claim 1, wherein the generation unit:

compiles multiple pieces of second data each having the second additional information added thereto and further adds third additional information thereto; and generates the relay data, in which first data having the first additional information added thereto and second data having the second additional information and the third additional information added thereto are compiled.

3. The on-board communication apparatus according to claim 2, wherein each of the first additional information and the second additional information includes information for identifying a communication protocol, and the third additional information includes information relating to the number of pieces of the second data included in the relay data.

4. The on-board communication apparatus according to claim 3, wherein the generation unit generates, as the relay data, data by compiling first data having the first additional information added thereto and second data having the second additional information and the third additional information added thereto, and adding fourth additional information thereto, and the fourth additional information includes information relating to the number of pieces of the first and second data included in the relay data.

5. The on-board communication apparatus according to claim 3, wherein the application processing unit includes:

a plurality of data management units that manage data of respective communication protocols; and a distribution unit that distributes the first data and the second data included in relay data received from the communication processing unit to the data management units of corresponding communication protocols based on the first additional information and the second additional information included in the relay data.

6. The on-board communication apparatus according to claim 3, wherein the first communication protocol is a communication protocol with which the largest quantity of data is received by the communication processing unit.

7. The on-board communication apparatus according to claim 2, wherein the generation unit generates, as the relay data, data by compiling first data having the first additional information added thereto and second data having the second additional information and the third additional information added thereto, and adding fourth additional information thereto, and the fourth additional information includes information relating to the number of pieces of the first and second data included in the relay data.

8. The on-board communication apparatus according to claim 7, wherein the application processing unit includes:

a plurality of data management units that manage data of respective communication protocols; and a distribution unit that distributes the first data and the second data included in relay data received from the communication processing unit to the data management units of corresponding communication protocols based on the first additional information and the second additional information included in the relay data.

9. The on-board communication apparatus according to claim 7, wherein the first communication protocol is a communication protocol with which the largest quantity of data is received by the communication processing unit.

10. The on-board communication apparatus according to claim 2, wherein the application processing unit includes:

a plurality of data management units that manage data of respective communication protocols; and a distribution unit that distributes the first data and the second data included in relay data received from the communication processing unit to the data management units of corresponding communication protocols based on the first additional information and the second additional information included in the relay data.

11. The on-board communication apparatus according to claim 2, wherein the first communication protocol is a communication protocol with which the largest quantity of data is received by the communication processing unit.

12. The on-board communication apparatus according to claim 1, wherein the application processing unit includes:

a plurality of data management units that manage data of respective communication protocols; and a distribution unit that distributes the first data and the second data included in relay data received from the communication processing unit to the data management units of corresponding communication protocols based on the first additional information and the second additional information included in the relay data.

13. The on-board communication apparatus according to claim 12, wherein the first communication protocol is a communication protocol with which the largest quantity of data is received by the communication processing unit.

14. The on-board communication apparatus according to claim 1, wherein the first communication protocol is a communication protocol with which the largest quantity of data is received by the communication processing unit.

15. An on-board communication system comprising:

an application processing apparatus that executes an application program; and a communication processing apparatus that includes: a first communication unit that communicates with one or more on-board apparatuses with a first communication protocol; one or more second communication units that communicate with one or more on-board apparatuses with a second communication protocol that is different from the first communication protocol; a generation unit that generates relay data including first data received by the first communication unit and second data received by the second communication units; and a relay unit that transmits the generated relay data to the application processing apparatus, wherein the generation unit:

compiles multiple pieces of first data received by the first communication unit and adds first additional information thereto;

adds second additional information to each piece of second data received by the second communication units; and generates the relay data, in which first data having the first additional information added thereto and one or more pieces of second data each having the second additional information added thereto are compiled.

16. A communication processing apparatus comprising:

a first communication unit that communicates with one or more on-board apparatuses with a first communication protocol;

one or more second communication units that communicate with one or more on-board apparatuses with a second communication protocol that is different from the first communication protocol;

a generation unit that generates relay data including first data received by the first communication unit and second data received by the second communication units; and a relay unit that transmits the generated relay data to an application processing apparatus that executes an application program, wherein the generation unit:

compiles multiple pieces of first data received by the first communication unit and adds first additional information thereto;

adds second additional information to each piece of second data received by the second communication units; and generates the relay data, in which first data having the first additional information added thereto and one or more pieces of second data each having the second additional information added thereto are compiled.

* * * * *